(12) United States Patent
Kim

(10) Patent No.: US 11,589,705 B2
(45) Date of Patent: Feb. 28, 2023

(54) FOREIGN SUBSTANCE TRAP DEVICE AND COOKING DEVICE USING SAME

(71) Applicant: NUC Electronics Co., Ltd., Daegu (KR)

(72) Inventor: Jong Boo Kim, Daegu (KR)

(73) Assignee: NUC ELECTRONICS CO., LTD., Daegu (KR)

( * ) Notice: Subject to any disclaimer, the term of this patent is extended or adjusted under 35 U.S.C. 154(b) by 422 days.

(21) Appl. No.: 16/621,680

(22) PCT Filed: Aug. 29, 2019

(86) PCT No.: PCT/KR2019/011057
§ 371 (c)(1),
(2) Date: Dec. 11, 2019

(87) PCT Pub. No.: WO2020/050548
PCT Pub. Date: Mar. 12, 2020

(65) Prior Publication Data
US 2021/0007545 A1   Jan. 14, 2021

(30) Foreign Application Priority Data
Sep. 5, 2018   (KR) .......................... 10-2018-0106036

(51) Int. Cl.
*F16K 31/18*    (2006.01)
*A47J 36/00*    (2006.01)
(Continued)

(52) U.S. Cl.
CPC ............... *A47J 36/00* (2013.01); *A47J 27/04* (2013.01); *A47J 43/0716* (2013.01); *F16K 31/18* (2013.01)

(58) Field of Classification Search
CPC .. F16K 31/18; Y10T 137/3099; A47J 43/0716
See application file for complete search history.

(56) References Cited

U.S. PATENT DOCUMENTS

| 499,463 A | * | 6/1893 | Lindsay | ................ F24D 19/081 236/62 |
| 1,166,439 A | * | 1/1916 | Corbin | .................. F16K 24/044 251/126 |

(Continued)

FOREIGN PATENT DOCUMENTS

| CN | 106308575 A | 1/2017 |
| EP | 2 716 187 A1 | 4/2014 |

(Continued)

OTHER PUBLICATIONS

The Extended European Search Report for European Patent Application No. 19813214.4, dated Jun. 3, 2022.

*Primary Examiner* — Umashankar Venkatesan

(57) ABSTRACT

A foreign substance trap device according to an embodiment of the present disclosure includes: a first member in which at least one fluid intake hole is formed; a second member in which at least a portion of an exhaust channel, through which gas in liquid flowing inside through the fluid intake hole is discharged, is formed; and a movable member movably disposed between the first member and the second member and closing the exhaust channel by being moved by liquid in fluid flowing inside through the fluid intake hole.

15 Claims, 18 Drawing Sheets

(51) Int. Cl.
 *A47J 27/04* (2006.01)
 *A47J 43/07* (2006.01)

(56) References Cited

U.S. PATENT DOCUMENTS

| | | | | | |
|---|---|---|---|---|---|
| 2,721,620 | A | * | 10/1955 | Geer | F24D 19/083 |
| | | | | | 137/433 |
| 3,334,645 | A | * | 8/1967 | Weinstein | F16K 24/042 |
| | | | | | 137/448 |
| 5,480,054 | A | * | 1/1996 | Midden | A47J 41/0005 |
| | | | | | 220/202 |
| 7,806,135 | B2 | * | 10/2010 | Kaneko | F16K 31/1635 |
| | | | | | 137/512.5 |
| 7,886,759 | B2 | * | 2/2011 | Miyoshi | B60K 15/03519 |
| | | | | | 137/202 |
| 10,299,630 | B2 | * | 5/2019 | Chung | A47J 43/07 |
| 10,905,286 | B2 | * | 2/2021 | Cuaresma, Jr. | A47J 43/0727 |
| 11,311,148 | B2 | * | 4/2022 | Chung | B01F 33/70 |
| 2018/0310769 | A1 | | 11/2018 | Kim | |
| 2021/0052113 | A1 | * | 2/2021 | Thomas | B01F 35/189 |

FOREIGN PATENT DOCUMENTS

| | | |
|---|---|---|
| EP | 3 669 724 A1 | 6/2020 |
| JP | 6265729 B2 | 1/2018 |
| KR | 200273523 | 4/2002 |
| KR | 101769482 B1 | 8/2017 |
| KR | 101821786 B1 | 1/2018 |
| KR | 101878304 B1 | 7/2018 |
| WO | 2014/055557 A1 | 4/2014 |
| WO | 2016/072203 A1 | 5/2016 |
| WO | WO2018043872 A1 | 3/2018 |

\* cited by examiner

FIG. 4
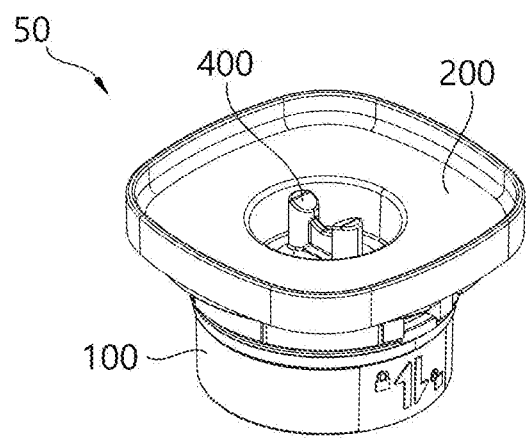
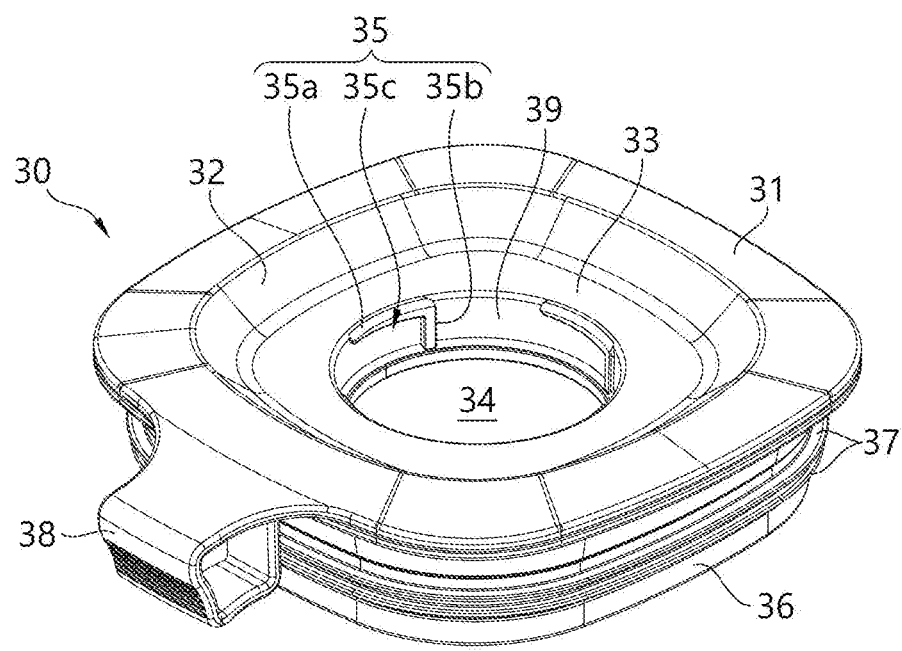

FIG. 5
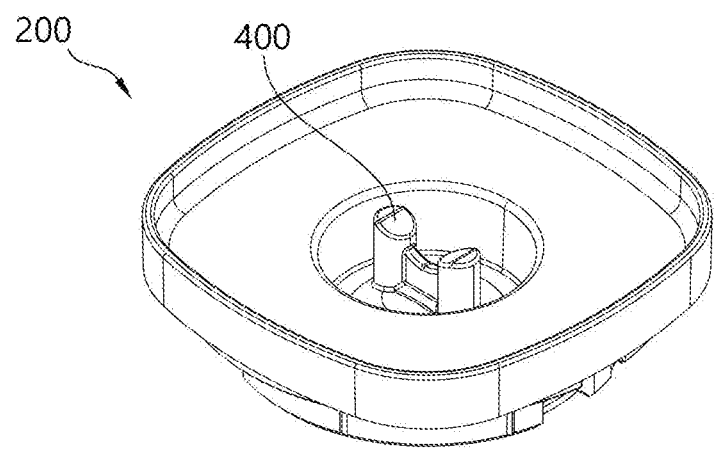
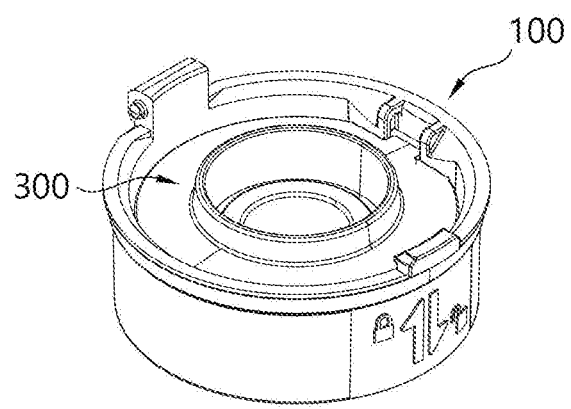

FOREIGN SUBSTANCE TRAP DEVICE AND COOKING DEVICE USING SAME

The present application is a National Phase of International Application No. PCT/KR2019/011057 filed on Aug. 29, 2019, which claims the priority benefit of Korean Patent Application No. 10-2018-0106036, filed on Sep. 5, 2018 in the Korean Intellectual Property Office, the disclosure of which is incorporated herein by reference.

TECHNICAL FIELD

The present disclosure relates to a foreign substance trap device and a cooking device using the foreign substance trap device and, more particularly, to a foreign substance trap device that filters out foreign substances suctioned in a vacuum suction process, and a cooking device using the foreign substance trap device.

BACKGROUND ART

There are various food cooking devices that pulverize, mix, juice, etc. food.

A food cooking device generally performs processing on food using processing members (a blade, a screw, etc.) after the food that is a processing target is put into a container.

Recently, cooking devices that make a container vacuum to make the inside of the container into a negative pressure environment and then perform processing on food in order to prevent oxidation of the food during a cooking process have been introduced.

However, when foreign substances enter an exhaust channel during a vacuum exhaust process, the foreign substances reach even a vacuum pump, and as a result, the vacuum pump is broken in many cases.

DISCLOSURE

Technical Problem

An object of the present disclosure is to provide a foreign substance trap device that can effectively block foreign substances, and a cooking device using the foreign substance trap device.

The objects of the present disclosure are not limited to the objects described above and other objects will be clearly understood by those skilled in the art from the following description.

Technical Solution

In order to achieve the objects, a foreign substance trap device according to an embodiment of the present disclosure includes: a first member in which at least one fluid intake hole is formed; a second member in which at least a portion of an exhaust channel, through which gas in liquid flowing inside through the fluid intake hole is discharged, is formed; and a movable member movably disposed between the first member and the second member and closing the exhaust channel by being moved by liquid in fluid flowing inside through the fluid intake hole.

In order to achieve the objects, a cooking device according to an embodiment of the present disclosure that includes a container accommodating food that is a processing target, a lid covering an opening of the container, and a vacuum pump evacuating air from the container through the lid, includes a foreign substance trap device installed in the lid and preventing liquid in the container from flowing into the vacuum pump while air in the container is excavated, in which the foreign substance trap device includes: a first member in which a least one fluid intake hole communicating with an inside of the container; a second member in which at least a portion of an exhaust channel, through which gas in liquid flowing inside through the fluid intake hole is discharged to the vacuum pump, is formed; and a movable member movably disposed between the first member and the second member and closing the exhaust channel by being moved by liquid in fluid flowing inside through the fluid intake hole.

In order to achieve the objects, a cooking device according to an embodiment of the present disclosure that includes a container accommodating food that is a processing target, an enclosure formed to surround at least a portion of the container and blocking noise generated from the container, and a vacuum pump evacuating air from the container through the enclosure, includes a foreign substance trap device installed in the lid and preventing liquid in the container from flowing into the vacuum pump while air in the container is excavated, in which the foreign substance trap device includes: a first member in which a least one fluid intake hole communicating with an inside of the container; a second member in which at least a portion of an exhaust channel, through which gas in liquid flowing inside through the fluid intake hole is discharged to the vacuum pump, is formed; and a movable member movably disposed between the first member and the second member and closing the exhaust channel by being moved by liquid in fluid flowing inside through the fluid intake hole.

The other details of the present disclosure are included in the following detailed description and the accompanying drawings.

Advantageous Effects

According to embodiments of the present disclosure, there are the following effects.

It is possible to effectively block not only solid foreign substances, but also liquid foreign substances.

The effects of the present disclosure are not limited to those described above and more various effects are included in the specification.

DESCRIPTION OF DRAWINGS

FIG. 4 is an exploded perspective view showing the lid and the foreign substance trap device of FIG. 3.

FIG. 5 is an exploded perspective view showing a first member, a second member, and a movable member of the foreign substance trap device of FIG. 4.

BEST MODE

Figure 1:
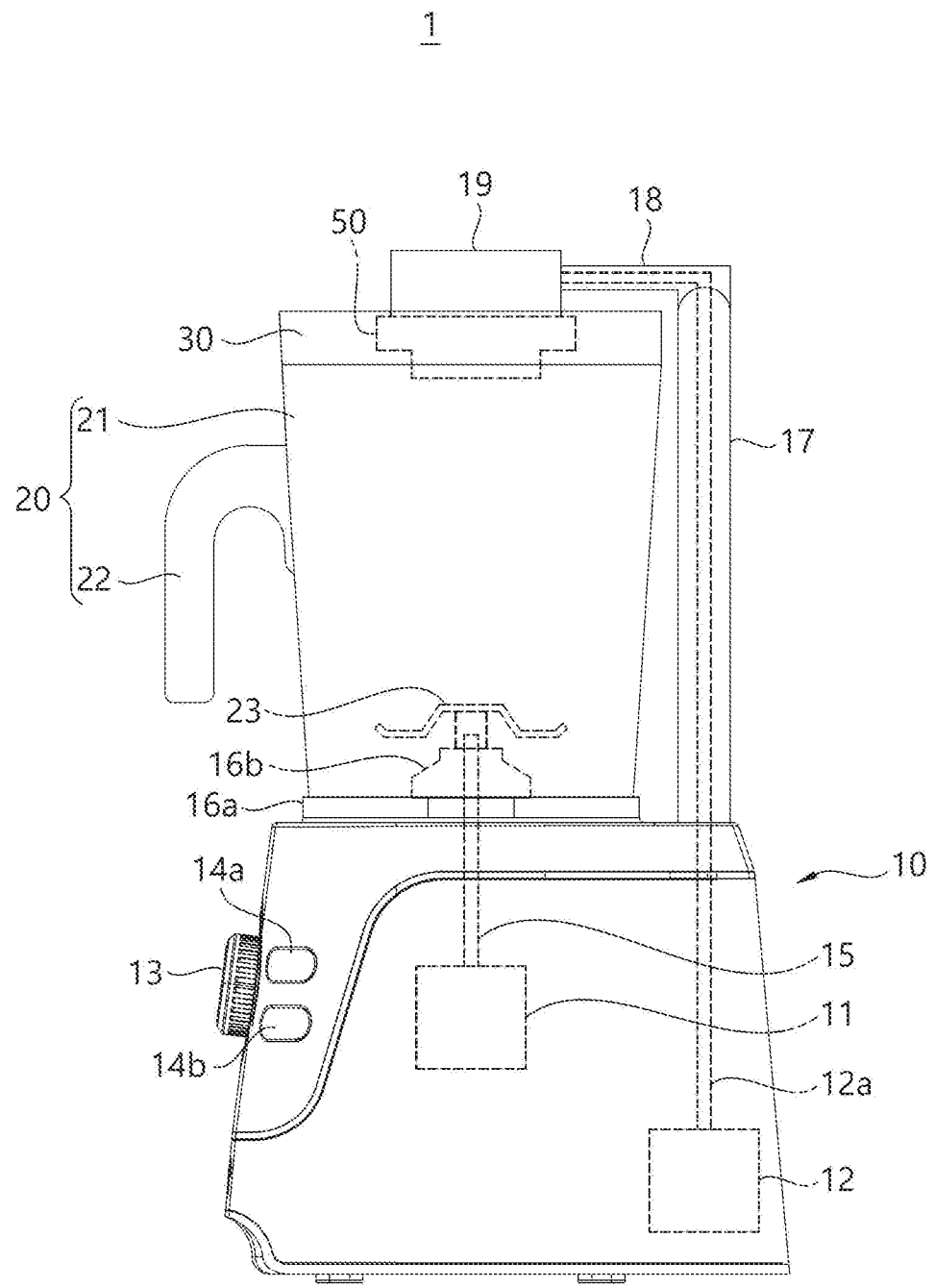
FIG. 1 is a view schematically showing a cooking device according to an embodiment of the present disclosure.

The advantages and features of the present disclosure, and methods of achieving them will be clear by referring to the exemplary embodiments that will be describe hereafter in detail with reference to the accompanying drawings. However, the present disclosure is not limited to the exemplary embodiments described hereafter and may be implemented in various ways, and the exemplary embodiments are provided to complete the description of the present disclosure and let those skilled in the art completely know the scope of the present disclosure and the present disclosure is defined by claims. Like reference numerals indicate like components throughout the specification.

Further, embodiments described in the specification will be explained with reference to cross-sectional views and/or schematic views that are ideal exemplary views of the present disclosure. Accordingly, the shapes of the exemplary views may be deformed by manufacturing technologies and/or tolerances. Further, components may be slightly enlarged or reduced in the drawings that show the present disclosure in consideration of the convenience of description. Like reference numerals indicate like components throughout the specification.

Hereafter, the present disclosure is described with reference to drawings for describing a foreign substance trap device according to an embodiment of the present disclosure and a cooking device using the foreign substance trap device.

FIG. 1 is a view schematically showing a cooking device according to an embodiment of the present disclosure.

As shown in FIG. 1, a cooking device 1 according to an embodiment of the present disclosure includes a base 10, a container 20, a lid 30, and a foreign substance trap device 50.

The base 10 may include therein a motor 11, a vacuum pump 12, and a circuit board (not shown) for controlling the motor 11 and the vacuum pump 12. Depending on embodiments, the motor 11 may be selectively included, but for the convenience of description, the cooking device 1 including both of the motor 11 and the vacuum pump 12 is exemplarily described hereafter.

Operation parts 13, 14a, and 14b for operating the cooking device 1 may be disposed on the front surface and/or sides of the base 10. In the embodiment, as the operation parts 13, 14a, and 14b, a plurality of buttons 14a and 14b for selecting operation modes and a dial 13 for controlling output of the motor 11 or the vacuum pump 12 are shown, but, depending on embodiments, operation parts such as a capacitance type or decompression type touch display and an electrode switch may be used.

Depending on embodiments, the first button 14a may be a blending button for operating the motor 11 to rotate a processing member 23, the dial 13 may be configured to adjust the rotation speed of the processing member 23, and the second button 14b may be a vacuum button for evacuating air from an accommodation tub 21 by operating the vacuum pump 12.

In order to blend food in the accommodation tub 21, a user can press the first button 14a and then turn the dial 13 to perform blending while adjusting the rotation speed of the processing member 23, or in order to evacuate air from the accommodation tub 21, the user can evacuate air from the accommodation tub 21 by pressing the second button 14b.

However, when a user operates the dial 13 by mistake while air is evacuated from the accommodation tub 21 after the user presses the second button 14b, the rotation speed of the processing member 23 may not be adjusted or an error message that can be aurally or visually sensed may be output.

Alternatively, after a user presses the first button 14a and the processing member 23 is rotated or processing work by the processing member 23 is finished, when the user presses the second button 14b by mistake, the vacuum motor 12 may not be operated or an error message that can be aurally or visually sensed may be output.

Thereafter, in order to normally operate the second button 14b, the container has to be separated from the base 10 and then coupled again or power for the base 10 has to be cut and the supplied again so that the vacuum motor 12 can be normally operated when the user presses button 14b.

Though not shown, a level safety sensor (not shown) may be included in the accommodation tub 21 or the lid 30, and when the level safety sensor senses that ingredients in the accommodation tub 21 exceeds a predetermined level, the vacuum motor 12 may not be operated even if a user presses the second button 14b.

An air intake hole (without reference numeral) and an air discharge hole (without reference numeral) for flow of air for cooling the motor 11 or the vacuum pump 12 may be formed on the rear surface, sides, and/or the bottom of the base 10. In this case, the base 10 may include a fan (not shown) that forces air to flow therein.

A first container coupling portion 16a inside which the container 20 is seated may be formed on the top surface of the base 10. The first container coupling portion 16a, which is an annular member, may be configured to surround and support the lower end of the container 20.

A second container coupling portion 16b may protrude from the center of the top surface of the base 10. An output shaft 15 of the motor may be formed to be exposed to the outside through the second container coupling portion 16b. The output shaft 15 is rotatably exposed.

As shown in FIG. 1, the container 20 may include the accommodation tub 21 and a handle 22.

The accommodation tub 21 forms an accommodation space in which processing targets such as food are accommodated. An opening through which processing targets can be put inside is formed at the upper end of the accommodation tub 21, and the lid 30 is coupled to the accommodation tub 21 to be able to open/close the opening formed at the upper end of the accommodation tub 21.

The processing member 23 for processing processing targets may be disposed in the accommodation space of the accommodation tub 21. The processing member 23 may be a blade that pulverizes processing targets such as food, etc. The processing member 23 is rotatably installed in the accommodation tub 21 and is coupled to the output shaft 15 exposed upward from the second container coupling portion 16*b* directly or through at least one power transmission members. The motor 11 is a power source that provides rotational power for the processing member 23, and when the output shaft 15 is rotated by operation of the motor 11, the processing member 23 is rotated, thereby being able to process processing targets in the accommodation tub 21. A user can adjust the RPM of the processing member 23 by controlling the output of the motor 11 using the dial 13.

The handle 22 is supported on the outer side of the accommodation tub 21.

The handle 22 may be integrally formed with the accommodation tub 21.

On the other hand, the cooking device 1 according to the embodiment further includes a support post 17, a swing arm 18, and a suction port 19.

The support post 17 may extend upward from the top surface of the base 10.

The support post 17 may be formed on the top surface of the base at a position adjacent to the rear surface of the base 10 and the swing arm 18 is rotatably installed at the upper end of the support post 17.

The intake port 19 is disposed at an end of the swing arm 18.

The intake port 19 is connected to the vacuum pump 12 through a vacuum exhaust line 12*a*. The vacuum exhaust line 12*a* may be installed to pass through the insides of the swing arm 18 and the support post 17. It is preferable that the vacuum exhaust line 12*a* is made of a material having excellent flexibility to be deformed together with the swing arm 18 when the swing arm 18 and the suction port 19 are rotated with respect to the support post 17.

The foreign substance trap device 50 is disposed in the lid 30 in close contact with the suction port 19 such that vacuum pressure by the vacuum pump 12 is transmitted to the accommodation space of the accommodation tub 21 through the vacuum exhaust line 12*a*, the intake port 19, and the foreign substance trap device 50.

Hereafter, the foreign substance trap device 50 is described.

Figure 2:
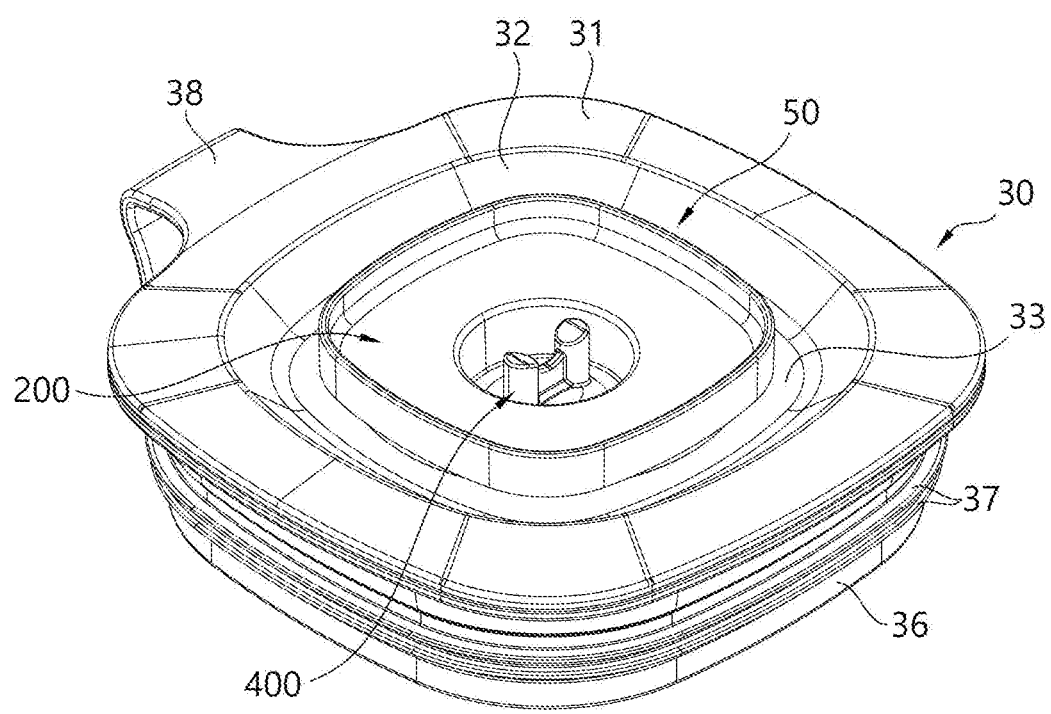
FIG. 2 is a perspective view showing the upper portion of a lid equipped with a foreign substance trap device according to an embodiment of the present disclosure.
Figure 3:
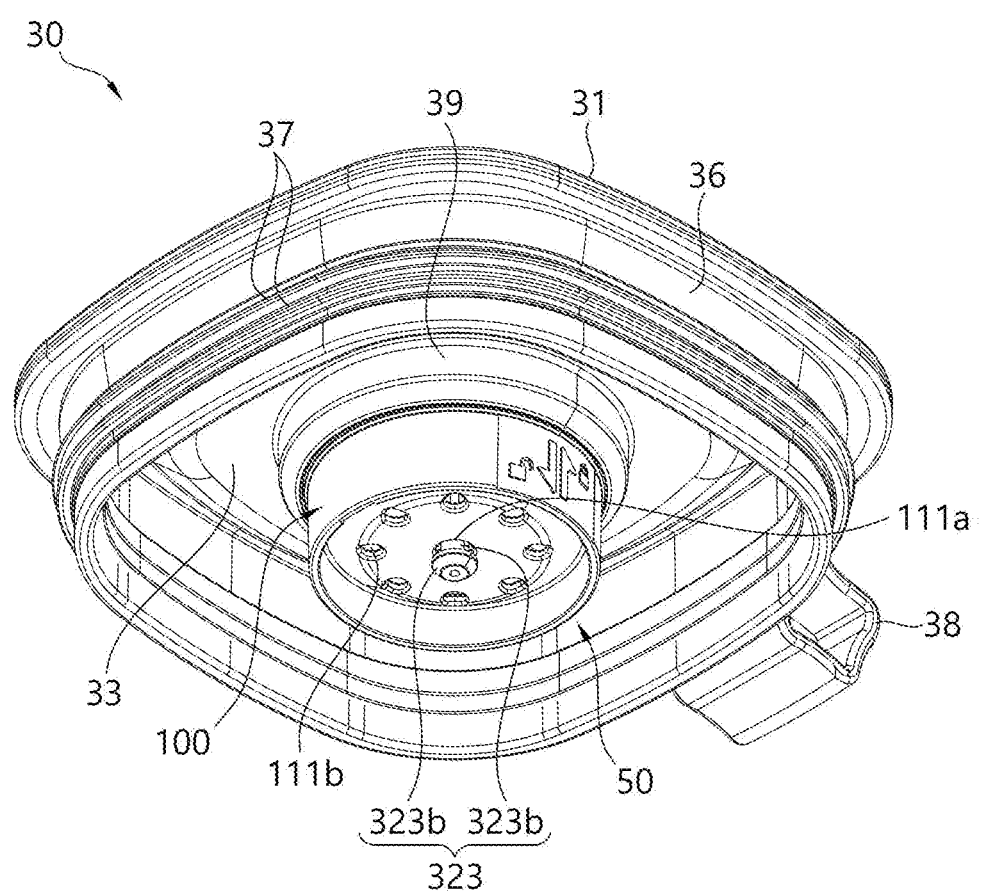
FIG. 3 is a perspective view showing the lower portion of the lid equipped with the foreign substance trap device according to an embodiment of the present disclosure.

FIG. 2 is a perspective view showing the upper portion of a lid equipped with a foreign substance trap device according to an embodiment of the present disclosure, FIG. 3 is a perspective view showing the lower portion of the lid equipped with the foreign substance trap device according to an embodiment of the present disclosure, and FIG. 4 is an exploded perspective view showing the lid and the foreign substance trap device of FIG. 3.

As shown in FIGS. 2 to 4, the foreign substance trap device 50 according to an embodiment of the present disclosure is detachably installed in the lid 30. When the foreign substance trap device 50 is installed in the lid 30, as shown in FIG. 2, a second member 200 forming the upper portion of the foreign substance trap device 50 is exposed over the lid 30, and as shown in FIG. 4, a first member 100 forming the lower portion of the foreign substance trap device 50 is exposed under the lid 30.

As shown in FIG. 4, the upper portion of the lid 30 include a first top surface portion 31, a second top surface portion 32, and a third top surface portion 33. The first top surface portion 31 forms the edge of the upper portion of the lid 30 and is formed in an annular shape, the third top surface portion 33 is positioned lower than the first top surface portion 31 inside the first top surface portion 31, and the second top surface portion 32 connects the first top surface portion 31 and the third top surface portion 33 and forms an inclined surface.

A side surface portion 36 forming the side of the lid 30 is formed in an annular shape along the first top surface portion 31, and the outer circumference of the first top surface portion 31 protrudes outward further than the side surface portion 36. Further, a plurality of sealing rings 37 is formed on the side portion 36.

Accordingly, when the lid 30 is installed on the upper end of the accommodation tub 21, the side portion 36 is inserted into the accommodation tub 21 and the plurality of sealing rings 37 come in close contact with the inner surface of the accommodation tub 21, thereby preventing leakage of the food accommodated in the accommodation tub 21. Further, the edge of the first top surface portion 31 protruding outward further than the side portion 36 is seated on the upper end of the accommodation tub 21.

The lid 30 includes a flap 38 extending from a side of the first top surface portion 31. The flap 38 may be used as a member that fixes the lid to the container 20 or may be used as a member that enables a user to insert fingers, etc. and pull the lid 30 when separating the lid 30 from the container 20.

A trap installation hole 34 is formed through the center portion of the third top surface portion 33. The trap installation hole 34 is a space in which the foreign substance trap device 50 is installed. A trap installation portion 35 is formed on the inner surface of the trap installation hole 34 so that the foreign substance trap device 50 is detachably coupled in the trap installation hole 34.

The trap installation portion 35 according to the embodiment includes a pressing protrusion portion 35*a* horizontally protruding a predetermined length and a stopping protrusion portion 35*b* substantially vertically protruding from the pressing protrusion portion 35*a*. As shown in FIG. 4, a fixing portion accommodation space 35*c* in which a fixing portion 261 (see FIG. 9) of the foreign substance trap device 50 is accommodated is formed between the pressing protrusion portion 35*a* and the stopping protrusion portion 35*b*.

When the foreign substance trap device 50 is installed at the trap installation portion 35, the fixing portion 261 of the foreign substance trap device 50 is inserted toward the stopping protrusion portion 35*b* from a side of the pressing protrusion portion 35*a*. According to the embodiment shown in FIG. 4, it is possible to move the fixing portion 261 toward the stopping protrusion portion 35*b* from a side of the pressing protrusion portion 35*a* by inserting a portion of the foreign substance trap device 50 into the trap installation portion 35 and then rotating the foreign substance trap device 50 clockwise.

As shown in FIG. 4, since the pressing protrusion portion 35*a* is formed such that the height of the fixing portion accommodation space 35*c* decreases as the pressing protrusion portion 35*a* is fitted to the stopping protrusion portion 35*b*, the fixing portion 261 is pressed by the pressing protrusion portion 35*a* and fixes the foreign substance trap device 50 in the trap installation portion 35. However, since there is the stopping protrusion portion 35*b*, the foreign substance trap device 50 can be rotated clockwise only until the fixing protrusion 261 is stopped by the stopping protrusion portion 35b. Accordingly, the installation direction of the foreign substance trap device 50 to the lid 30 is the same regardless of force of a user.

When separating the foreign substance trap device 50 from the lid 30, a user rotates the foreign substance trap device 50 counterclockwise and lifts the foreign substance trap device 50 from the lid 30 after the fixing portion 261 is separated out of the pressing protrusion portion 35a, thereby being able to separate the foreign substance trap device 50 from the lid 30.

Through the configuration according to FIGS. 2 to 4, it is possible to easily attach/detach the foreign substance trap device 50 to/from the lid 30 in order to wash the foreign substance trap device 50, etc., and when it is required to forcibly move or press food in the accommodation tub 21 toward the processing member 23, it is possible to remove the foreign substance trap device 50 from the lid 30 and then insert a pressing rod (not shown) into the accommodation tub 21 through the trap installation hole 34.

Hereafter, the foreign substance trap device 50 is described in more detail.

FIG. 5 is an exploded perspective view showing a first member, a second member, and a movable member of the foreign substance trap device of FIG. 4.

As shown in FIG. 5, the foreign substance trap device 50 according to an embodiment of the present disclosure includes a first member 100, a second member 200, a movable member 300, and a check valve 400. The first member 100 forms the lower portion of the foreign substance trap device 50 and the second member 200 forms the upper portion of the foreign substance trap device 50. The check valve 400 is coupled to the second member 200 and the movable member 300 is movably installed between the first member 100 and the second member 200.

First, the second member 200 and the check valve 400 are described.

Figure 6:
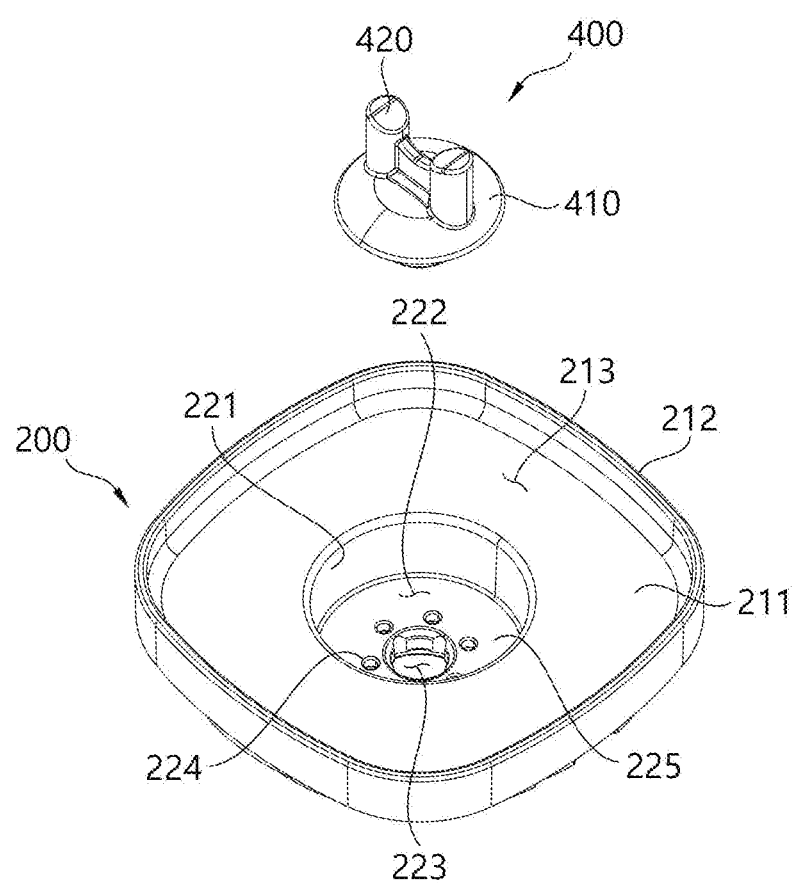
FIG. 6 is an exploded perspective view showing the first member of FIG. 5.
Figure 7:
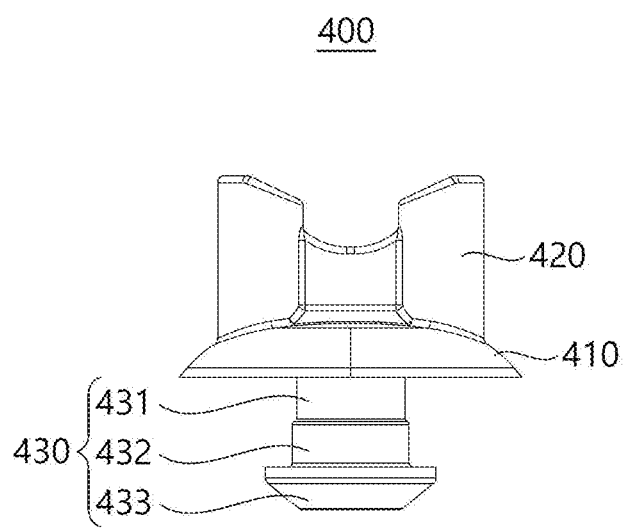
FIG. 7 is a front view showing a check valve of FIG. 6.
Figure 8:
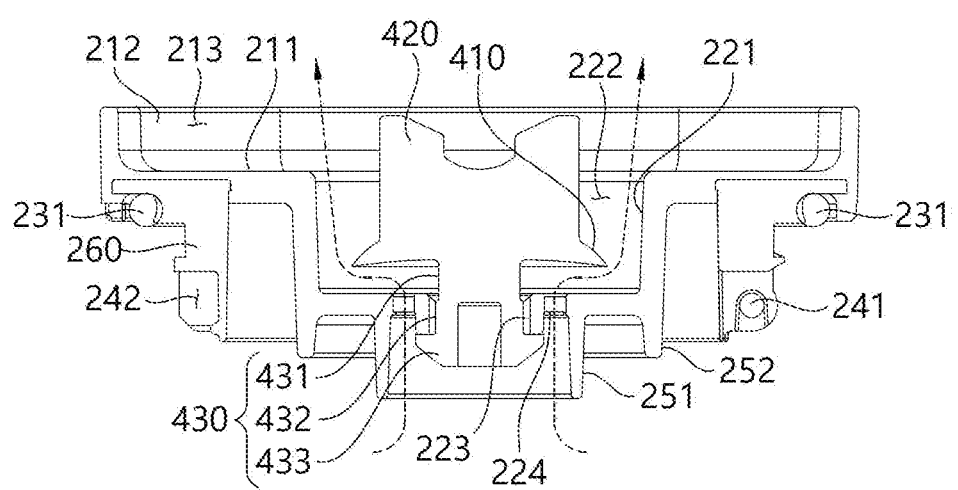
FIG. 8 is a vertical cross-sectional view of the second member.

FIG. 6 is an exploded perspective view showing the second member of FIG. 5, FIG. 7 is a front view showing the check valve of FIG. 6, and FIG. 8 is a cross-sectional view of the second member.

As shown in FIGS. 6 and 8, the second member 200 includes a port contact surface 211.

The port contact surface 211 may be formed as a substantially horizontal plane and a ridge 212 protrudes upward along the outer circumference of the port contact surface 211. The space surrounded by the port contact surface 211 and the ridge 212 forms a port accommodation space 213 in which at least a portion of the intake port 19 (see FIG. 1) is accommodated.

A check valve accommodation hole 222 is formed at the center portion of the port contact surface 211. The side wall 211 of the check valve accommodation hole 222 extends substantially vertically downward from the port contact surface 211, and an installation portion accommodation hole 223 and an exhaust channel outlet 224 are formed in the bottom 225 of the check valve accommodation hole 222. As shown in FIG. 6, the exhaust channel outlet 224 may be formed as a plurality of pieces around the installation portion accommodation hole 223.

As shown in FIG. 8, a first downward protrusive ring 251 and a second downward protrusive ring 252 extend downward under the bottom 225. The first downward protrusive ring 251 is formed to surround the exhaust channel outlet 224 and the second downward protrusive ring 252 is formed to surround the first downward protrusive ring 251. The first downward protrusive ring 251 is formed to protrude downward further than the second downward protrusive ring 252.

A side wall portion 260 protruding downward to surround the second downward protrusive ring 252 is formed under the port contact surface 211. A sealing ring 231 is disposed on the side wall portion 260. The sealing ring 231 is brought in contact with the third top surface portion 33 (see FIG. 4) when the foreign substance trap device 50 is installed in the lid 30, so it seals the portion between the trap installation hole 34 and the foreign substance trap device 50, thereby preventing a loss of vacuum pressure.

A rotary shaft accommodation hole 241 in which a second member rotary shaft 141a (see FIG. 12) is accommodated is formed at a side of the side wall portion 260, and a fixed portion accommodation groove 242 in which a second member fixing portion 142 (see FIG. 9) is accommodated is formed at the other side of the side wall portion 260.

As shown in FIG. 7, the check valve 400 includes an opening/closing wing 410, a handle 420, and an installation portion 430.

The opening/closing wing 410 has a flat bottom and an arc top surface and is made of an elastic material. Accordingly, elastic deformation becomes easy as it goes to the edge portion in comparison to the center portion.

The handle 420 extends upward from the center portion of the opening/closing wing 410. It is preferable that the handle 420 is formed in a suitable shape for a user to hold it and move up the check valve 400.

The installation portion 430 extends downward from the center portion of the opening/closing wing 410. As shown in FIG. 7, the installation portion 430 includes a first installation portion 431, a second installation portion 432, and a third installation portion 433.

The first installation portion 431 extends downward from the opening/closing wing 410 and has an outer diameter smaller than the inner diameter of the installation portion accommodation hole 223.

The second installation portion 432 extends downward from the first installation portion 431 and has an outer diameter larger than the outer diameter of the first installation portion 431. However, the size of the outer diameter of the second installation portion 432 is determined such that the check valve 400 is not moved down by its own weight when the second installation portion 432 is fitted in the installation portion accommodation hole 223. To this end, the outer diameter of the second installation portion 432 may be the same as the inner diameter of the installation portion accommodation hole 223 or may be determined to have an intermediate fitting tolerance with respect to the installation portion accommodation hole 223.

The upper end of the second installation portion 432 is formed to be inclined to smoothly connect the stepped difference of the first installation portion 431 and the second installation portion 432. In this case, with the first installation portion 431 of the check valve 400 positioned in the installation portion accommodation hole 223, when a user lifts the check valve 400 such that the second installation portion 432 is positioned in the installation portion accommodation hole 223, the second installation portion 432 is naturally inserted into the installation portion accommodation hole 223, so the check valve 400 can be smoothly moved up.

The third installation portion 433 extends downward from the second installation portion 432, makes a step from the second installation portion 432, and has an outer diameter larger than the second installation portion 432. As shown in FIG. 8, the third installation portion 433 is positioned under the bottom 22, thereby preventing the check valve 400 from separating from the second member 200.

As shown in FIG. 8, when the second installation portion 432 is fitted in the installation portion accommodation hole 223, a gap is formed between the opening/closing wing 410 and the exhaust channel outlet 224 and the check valve 400 is not moved down due to its own weight, so the air over the bottom 225 and the air under the bottom 225 are exchanged with each other through the exhaust channel outlet 224, and the pressures over and under the bottom 225 are in equilibrium.

Figure 9:
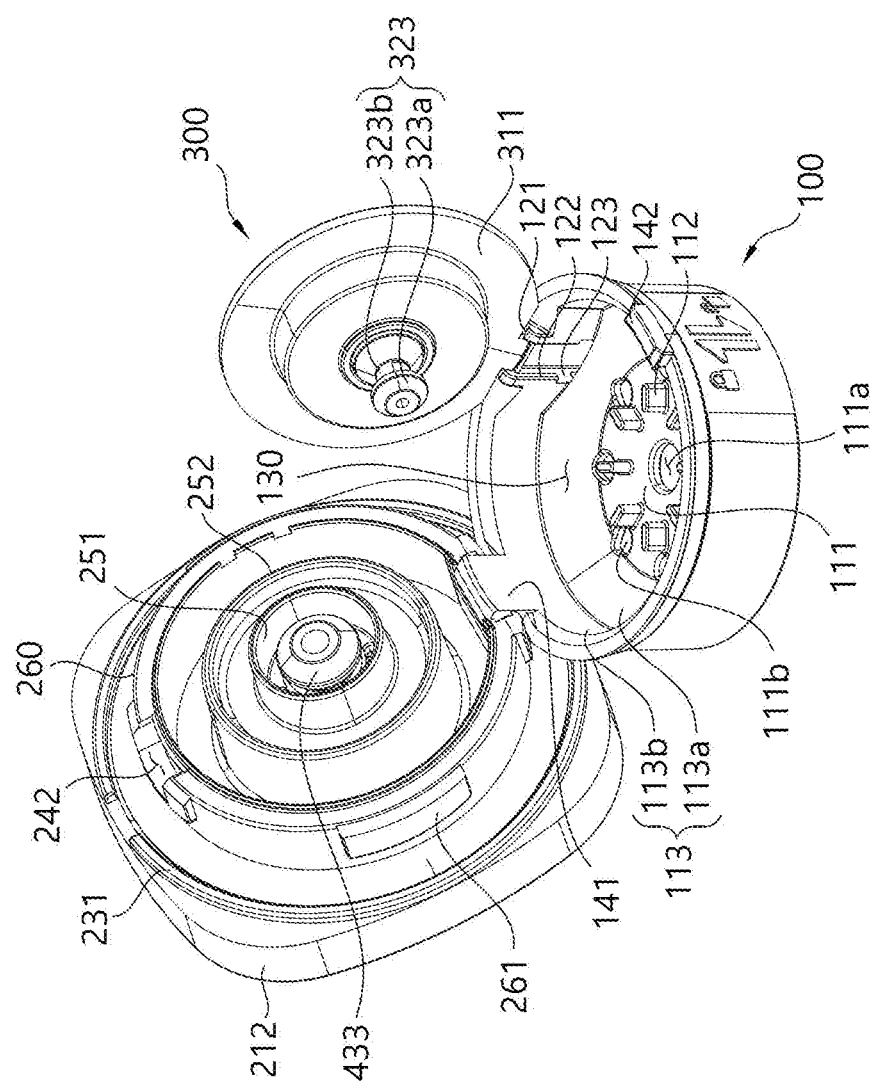
FIG. 9 is a perspective view showing an exploded state of the foreign substance trap device according to an embodiment of the present disclosure.

FIG. 9 is a perspective view showing an exploded state of the foreign substance trap device according to an embodiment of the present disclosure.

As shown in FIG. 9, in the foreign substance trap device 50, the movable member 300 is rotatably disposed at a side of the first member 100 and the second member 200 is rotatably disposed at the other side of the first member 100.

When the foreign substance trap device 50 is assembled, the movable member 300 is accommodated in the movable member accommodation space 130 formed in the first member 100 and then the second member 200 is closed such that the second member fixing portion 142 is accommodated in the fixing end accommodation groove 242, whereby the first member 100 and the second member 200 are combined. The second member fixing portion 142 accommodated in the fixing end accommodation groove 242 may be hooked to the side wall portion 260 so that the first member 100 is fixed to the second member 200 (see FIG. 14).

Hereafter, the first member 100 is described in detail.

As shown in FIG. 9, the first member 100 includes a bottom 111 and a side wall portion 113.

A lifting shaft accommodation hole 111a, a fluid inflow hole 111b, and a spacer 112 are formed in the bottom 111. The lifting shaft accommodation hole 111a is formed through the center portion of the bottom 111, and the fluid inflow hole 111b is formed as a plurality of pieces circumferentially around the lifting shaft accommodation hole 111a. The plurality of spacers 112 protrude upward a predetermined height from the bottom 111. As shown in FIG. 9, the spacer 112 may be formed between the lifting shaft accommodation hole 111a and the fluid inflow hole 111b, but, depending on embodiments, the spacer 112 may be formed between the fluid inflow holes 111b.

The side wall portion 113 extends upward from the bottom 111 and includes an inclined portion 113a forming an inclination from the outside of the bottom 111 and extending upward.

The inclined portion 113a moves foreign substances blocked by a foreign substance shield 311 to be described below toward the fluid inflow hole 111b. In order to discharge foreign substances well, it is preferable that the fluid inflow hole 111b is formed adjacent to the inclined portion 113a or a portion of the fluid inflow hole 111b is formed at the inclined portion 113a.

Figure 14:
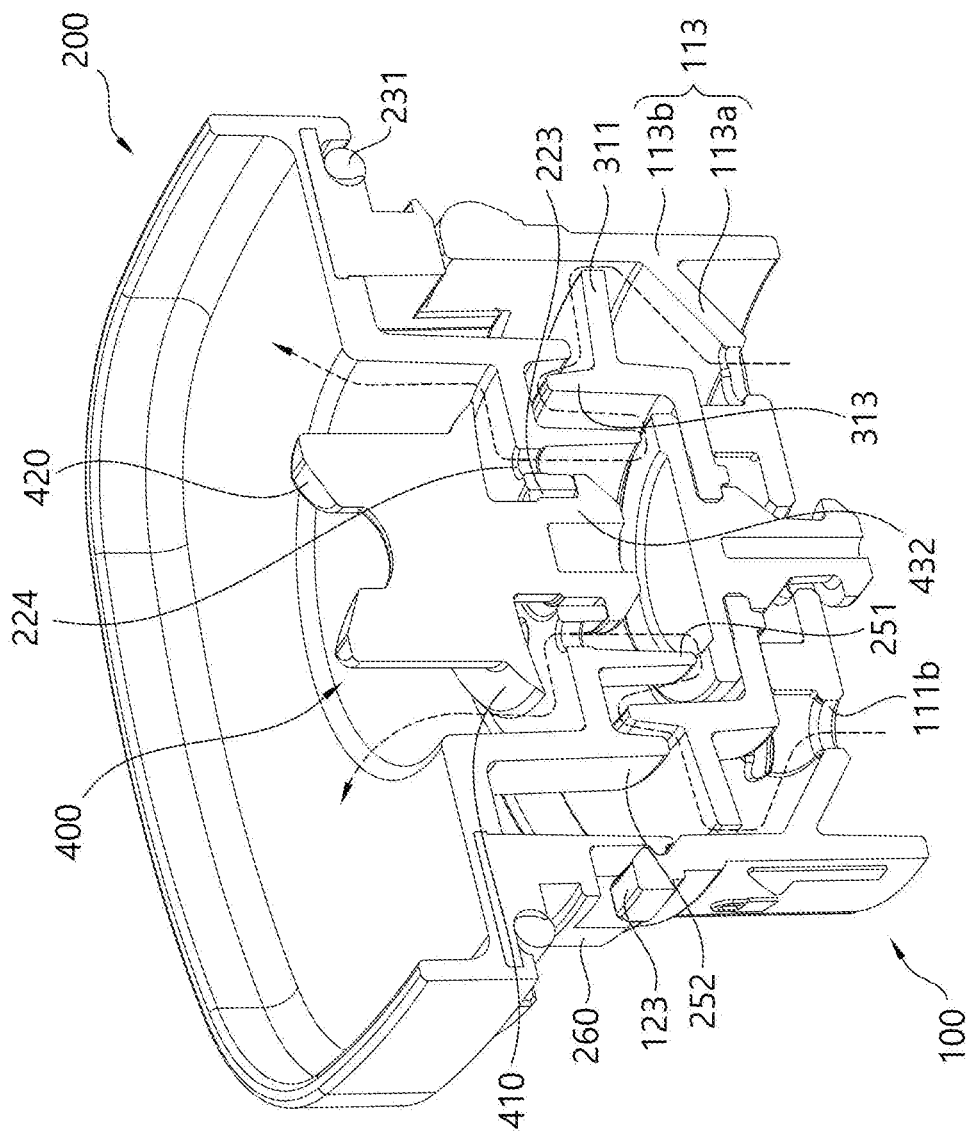
FIG. 14 is a vertical cross-sectional view of the foreign substance trap device according to an embodiment of the present disclosure.

A portion of the side wall portion 113 may surround the inclined portion 113a and the bottom 111 and may extend downward further than the bottom 111 (see FIG. 3 or 14). The lower end of the side wall portion 113 formed to surround the outer side of the bottom 111 prevents foreign substances from flying and entering the fluid inflow hole 111b due to vortexes, etc. generated by food rotated in the accommodation tub 21 by the processing member 23.

A guide groove 122 extending upward is formed at a side of the side wall portion 113. A stopper 123 is formed at the lower end of the guide groove 122 and the upper end of the guide groove 122 extends up to a rotary shaft support end 121 formed substantially at the upper end of a side of the side wall portion 113 to face the upper end. The guide groove 122 accommodates a rotary shaft 312 (see FIG. 10) of the movable member 300 to be described below and guides the movable member 300 such that the movable member 300 can move up/down along the guide groove 122.

Figure 12:
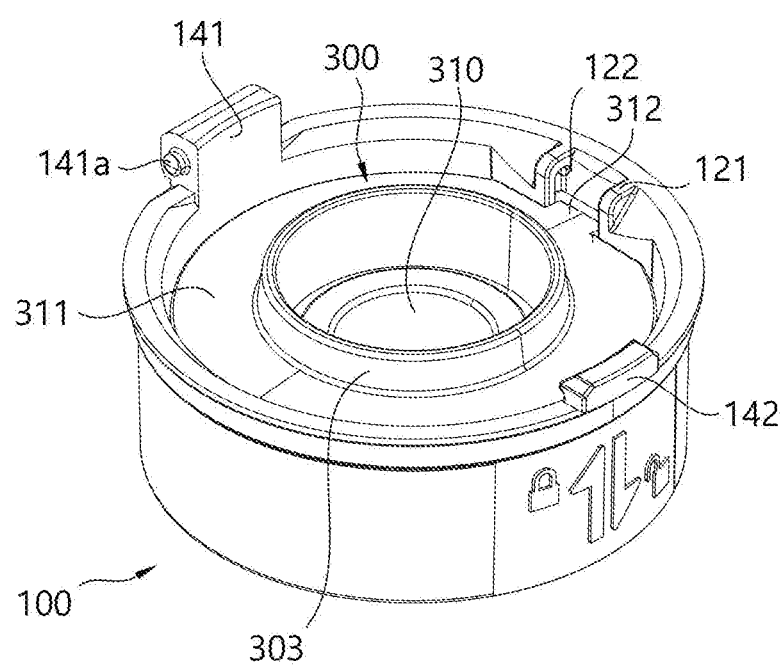
FIG. 12 is a perspective view showing a state in which the movable member is positioned at a first position.
Figure 13:
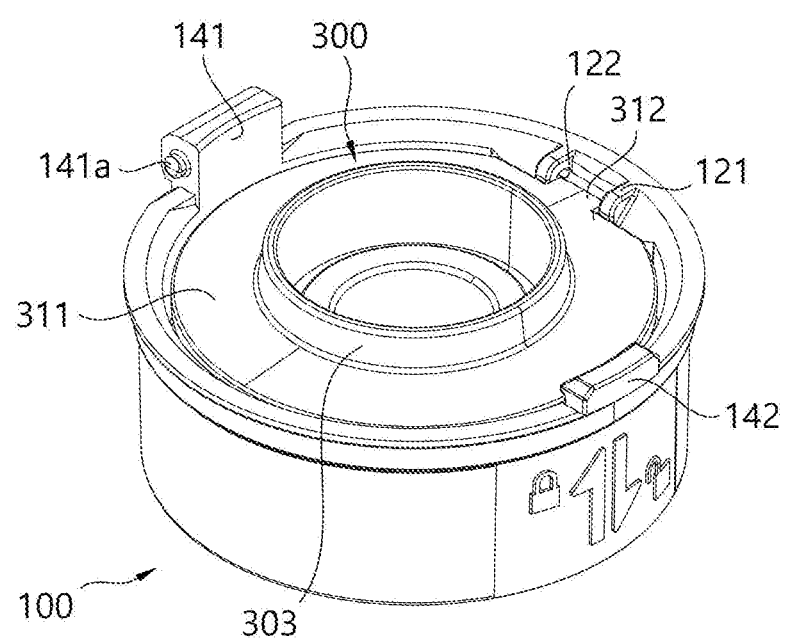
FIG. 13 is a perspective view showing a state in which the movable member is positioned at a second position.

FIG. 12 is a perspective view showing a state in which the actuating member is positioned at a first position and FIG. 13 is a perspective view showing a state in which the actuating member is positioned at a second position.

As shown in FIG. 12, when the movable member 300 is positioned at the first position, the rotary shaft 312 of the movable member 300 is positioned at the lower end of the guide groove 122. The rotary shaft 312 of the movable member 300 can be supported by the stopper 123 formed at the lower end of the guide groove 122. As shown in FIG. 13, when the movable member 300 is positioned at the second position, the rotary shaft 312 of the movable member 300 is positioned at the upper end of the guide groove 122.

A second member support portion 141 protruding upward is formed at the other side of the side wall portion 113. A second member rotary shaft 141a (see FIG. 12) protrudes from both sides of the second member support portion 141. As described above, the second member rotary shaft 141a is inserted in the rotary shaft accommodation hole 241 of the second member 200, thereby rotatably supporting the second member 200.

A second member fixing portion 142 protruding from the upper end of the side wall portion 113 is formed opposite to the second member support portion 141. As described above, second member fixing portion 142 is accommodated in the fixed portion accommodation groove 242 of the second member 200 and is hooked to the side wall portion 260 of the second member 200 such that the first member 100 is fixed to the second member 200.

The rotary shaft support portion 121 rotatably supporting the movable member 3000 and the second member support portion 141 rotatably supporting the second member 200 are formed at positions spaced apart from each other, and as shown in FIG. 9, they may be disposed with a gap of 90 degrees, but, depending on embodiments, they may be disposed with a gap of 60 degrees or 120 degrees.

By the configuration described above, the first member 100, the second member 200, and the movable member 300 are exploded, but are not easily separated, so the members can be easily washed by a user and the possibility of loss of the members is minimized.

In the embodiment, an example in which the movable member 300 is rotatably coupled to the first member was shown, but the movable member 300 may be configured not to separate from the second member 200 under the assumption that the movable member can move between the first member 100 and the second member 200.

Meanwhile, in the embodiment, it was exemplified that the second member 200 is coupled to the first member 100, but, depending on embodiments, the second member may be configured to be coupled to the movable member 300 coupled to the first member or may be configured to be coupled to the first member 100 and the movable member 300. In this case, when the movable member 300 is not positioned in the first member 100 or is not positioned between the first member 100 and the second member 200, the second member 200 may not be coupled. In this case, the first member 100 and the second member 200 cannot be coupled with the movable member 300, so a mistake by a user in assembling can be prevented.

Hereafter, the movable member 300 is described in detail.

Figure 10:
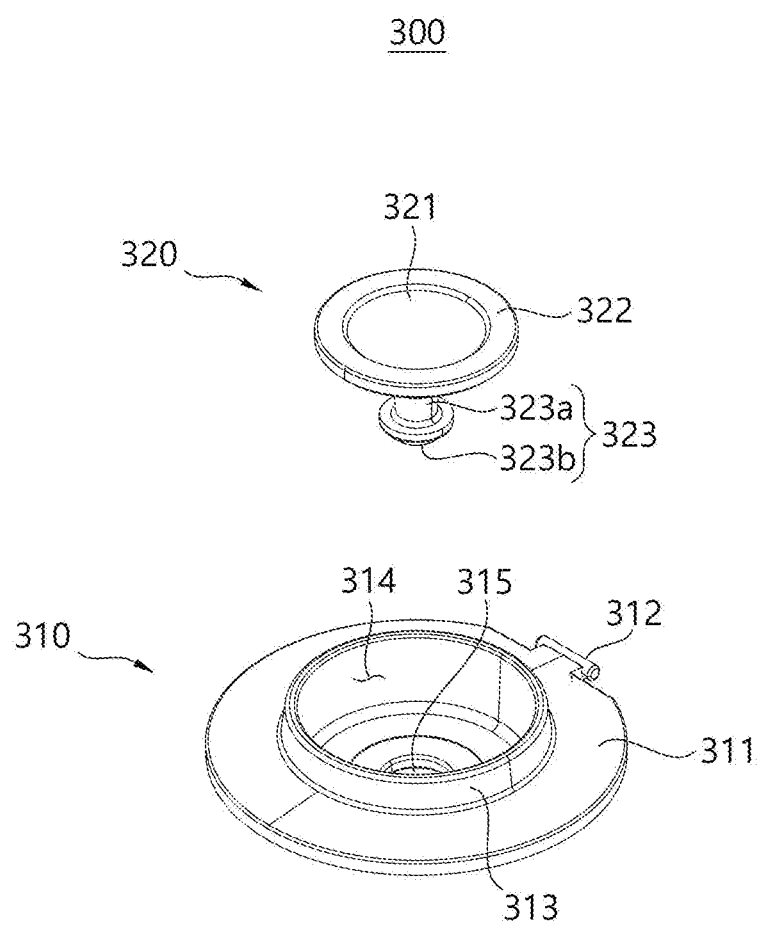
FIG. 10 is an exploded perspective view showing the movable member of FIG. 9.
Figure 11:
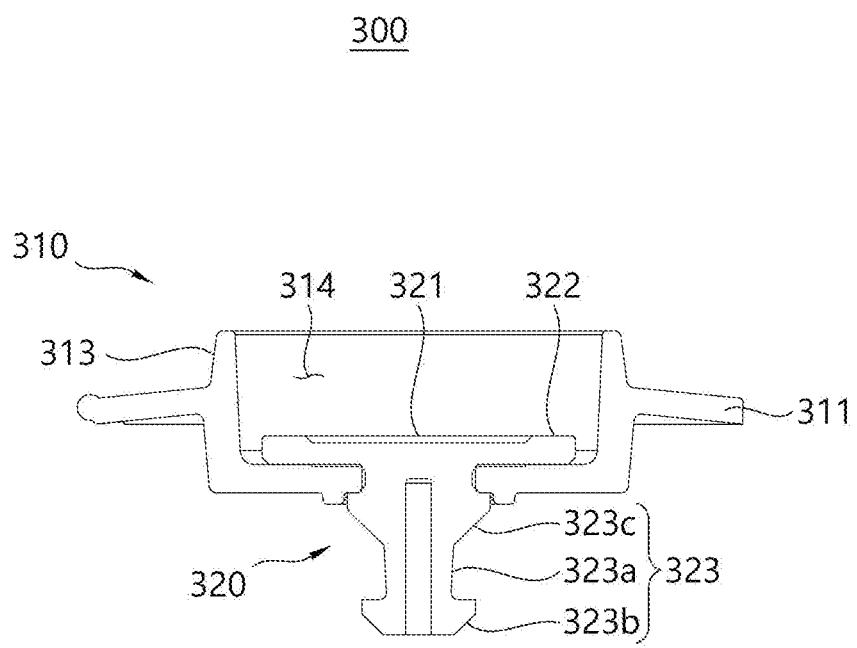
FIG. 11 is a cross-sectional view showing the movable member of FIG. 9.

FIG. 10 is an exploded perspective view showing the actuating member of FIG. 9 and FIG. 11 is a cross-sectional view showing the actuating member of FIG. 9.

As shown in FIGS. 10 and 11, the movable member 300 includes a hard part 310 and a soft part 320.

The hard part 310 includes a foreign substance shield 311 having a substantially ring-shaped plate shape. The outer diameter of the foreign substance shield 311 is smaller than the inner diameter of the side wall portion 113b of the first member 100, but has a size such that when the movable member 300 is installed in the first member 100, the edge of the foreign substance shield 311 can be positioned adjacent to the side wall portion 113b. For example, the gap between the foreign substance shield 311 and the side wall portion 113b may be less than 2 mm.

The hard part 310 further includes an upward protrusive ring 313 protruding in an annular shape from the top surface of the foreign substance shield 311. The up-protruding ring 313 can form the side wall of a chamber space 314 formed at the center of the hard part 310. A soft part installation hole 315 is formed through the center of the bottom of the chamber space 314.

Meanwhile, the soft part 320 includes blocking plates 311 and 312 and an assembly portion 323.

The blocking plates 311 and 312 includes a base plate 321 and a step 322 protruding upward from the edge of the base plate 321.

The assembly portion 323 extends downward from the bottom of the base plate 321 and includes a lifting shaft 323a, an anti-separation portion 323b, and a fixing portion 323c.

The fixing portion 323c extends downward from the bottom of the base plate 321 and is fitted in the soft part installation hole 315, thereby fixing the soft part 320 to the hard part 310. The lifting shaft 323a extends downward from the fixing portion 323c and has an outer diameter smaller than the inner diameter of the lifting shaft accommodation hole 111a of the first member 100. A gap is formed between the lifting shaft accommodation hole 111a and the lifting shaft 323a, so as long as the lifting shaft 323a is positioned in the lifting shaft accommodation hole 111a, the movable member 300 can freely move up/down with respect to the first member 100.

The anti-separation portion 323b extends from the lower end of the lifting shaft 323a, makes a step with the lifting shaft 323a, and has a diameter larger than the lifting shaft 323a. The anti-separation portion 323b is positioned under the bottom of the first member 111 and prevents the movable member 300 from separating from the first member 100.

The soft part 320 can be assembled/disassembled to/from the hard part 310 and is supposed to block an exhaust channel with the step 322 in contact with the first downward protrusive ring 251, so it is preferable that the soft part 320 is made of a material having excellent elasticity. On the contrary, the hard part 310 is supposed to block foreign substances using the substance shield 311, so it is preferable that the hard part 310 is made of a material that is not easily deformed.

FIG. 14 is a cross-sectional view of the foreign substance trap device according to an embodiment of the present disclosure. FIG. 14 shows also a state in which the check valve 400 keeps the exhaust channel outlet 224 open.

As described above, when the check valve 400 is moved up and the second installation portion 432 is fitted in the installation portion accommodation hole 223, the check valve 300 is not moved down due to its own weight, so the exhaust channel outlet 224 maintains a open state.

In this state, as shown in FIG. 14, the air under the first member 100 and the air over the second member exchange with each other along the exhaust channel connected between the fluid intake hole 111b, the foreign substance shield 311, and the side wall portion 113b, between the second downward protrusive ring 252 and the upward protrusive ring 313, between the first downward protrusive ring 251 and the upward protrusive ring 313, and to the exhaust channel outlet 224.

Accordingly, when the lid 30 is coupled to the container 20 with the foreign substance trap device 50 mounted on the lid 30, the pressure inside the accommodation tub 21 is in equilibrium with the external pressure. Since there is no pressure difference between the inside and the outside of the accommodation tub 21, a user can easily separate the lid 30 from the container 20.

That is, when the inside of the accommodation tub 21 is at a negative pressure and the outside of the container 20 is at an atmospheric pressure, a user has difficulty in separating the lid 30. Accordingly, a user can easily separate the lid 30 by moving up the check valve 14 into the state shown in FIG. 14 and the separating the lid 30 from the container 20.

Figure 15:
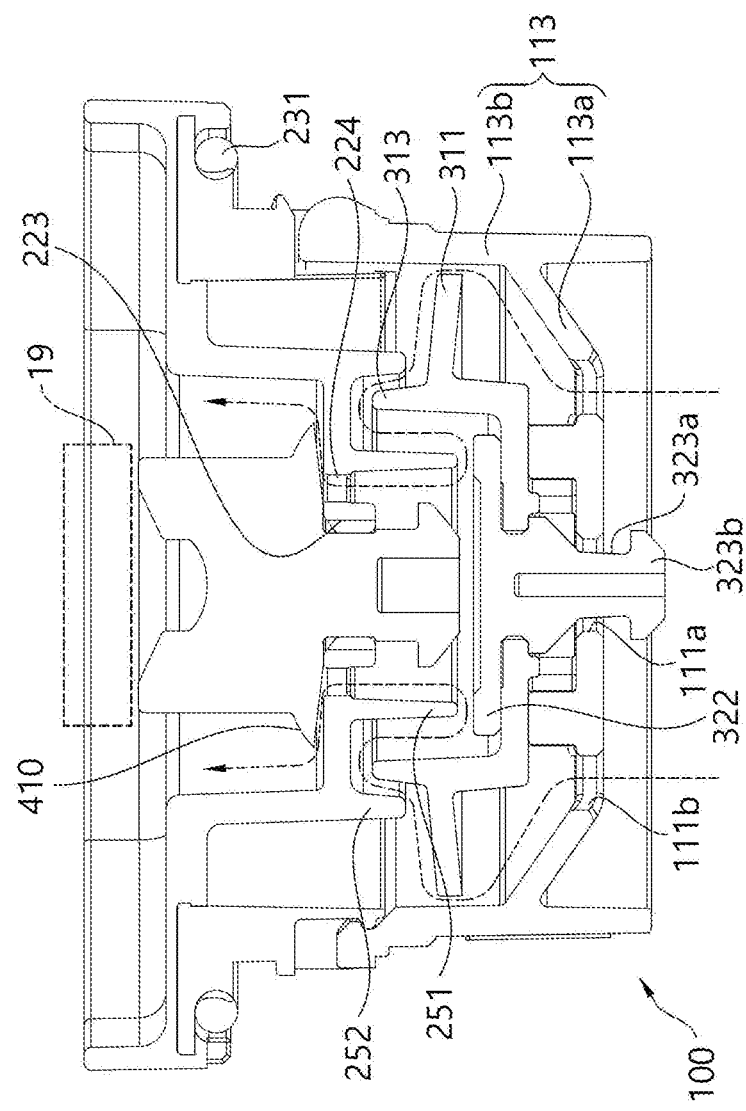
FIG. 15 is a cross-sectional view showing the foreign substance trap device with an exhaust channel open in a vacuum suction state.

FIG. 15 is a cross-sectional view showing the foreign substance trap device with an exhaust channel open in a vacuum suction state.

As shown in FIG. 15, in a vacuum suction state, some configuration of the intake port 19 provides vacuum pressure while pressing the handle 420 of the check valve 400.

Since the handle 420 of the check valve 400 is pressed down, the center portion of the opening/closing wing 410 is pressed to the bottom 225 of the check valve accommodation hole 222. Meanwhile, vacuum pressure is provided to the check valve accommodation hole 222 from the vacuum pump 12 through the intake port 19, so the edge of the opening/closing wing 410 is elastically deformed and lifted by the vacuum pressure, thereby opening the exhaust channel outlet 224.

Accordingly, the gas in the accommodation tub 21 is discharged outside along the exhaust channel connected between the fluid intake hole 111b, the foreign substance shield 311, and the side wall portion 113b, between the second downward protrusive ring 252 and the upward protrusive ring 313, between the first downward protrusive ring 251 and the upward protrusive ring 313, and to the exhaust channel outlet 224, whereby the inside of the accommodation tub 21 becomes a vacuum state.

While the air in the accommodation tub 21 is evacuated in the state of FIG. 15, liquid, etc. in the accommodation tub 21 may flow into the foreign substance trap device 50. For example, ingredients may fly into the fluid intake hole 111b during cooking or bubbles produced during cooking may rise and enter the fluid intake hole 111b.

When a foreign substance such as liquid reaches the vacuum pump 12, the vacuum pump 12 is easily damaged. Accordingly, the foreign substance trap device 50 prevents foreign substances such as liquid from entering the vacuum pump 12.

When a solid foreign substance enters the fluid intake hole 111b, the solid foreign substance drops again into the accommodation tub 21 through the fluid intake hole 111b along the inclined portion 113a by its own weight or remains on the bottom 111.

Even if a solid foreign substance is moved along the exhaust channel by influence by vacuum pressure, the solid foreign substance cannot pass through the gap between the foreign substance shield 311 and the side wall portion 113b of the first member 100 and is blocked by the foreign substance shield 311 because the gap is narrow. As a result, the solid foreign substance drops again into the accommodation tub 21 through the fluid intake hole 111b along the inclined portion 113a by its own weight or remains on the bottom 111.

Figure 16:
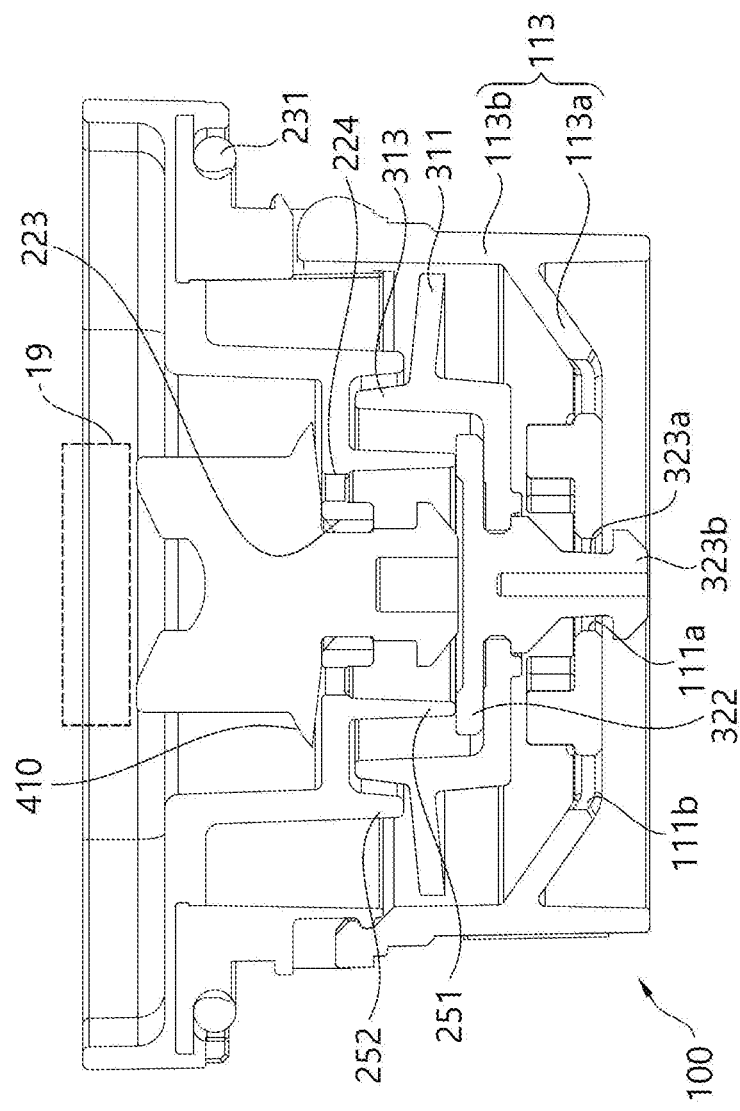
FIG. 16 is a cross-sectional view showing the foreign substance trap device with the exhaust channel closed in the vacuum suction state.

FIG. 16 is a cross-sectional view showing the foreign substance trap device with the exhaust channel closed in the vacuum suction state.

When a large amount of liquid foreign substance such as bubbles flows into the fluid intake hole 111b, the movable member 300 is lifted by the buoyancy of the liquid foreign substance. Accordingly, as shown in FIG. 16, the movable member 300 is moved to the second position and the step 322 of the movable member 300 closes a portion of the exhaust channel by coming in contact with the first downward protrusive ring 251. Accordingly, vacuum exhaust through the exhaust channel is stopped, thereby being able to prevent the liquid foreign substance from reaching the vacuum pump 12.

It was exemplified in the embodiment that the exhaust channel is closed only by the step 322 of the movable member 300 coming in contact with the first downward protrusive ring 251, but, depending on embodiments, the upward protrusive ring 313 may be configured to primarily block the exhaust channel by coming in contact with the first downward protrusive ring 251 and/or the second downward protrusive ring 252 and the step 322 may be configured to secondarily block the exhaust channel by coming in contact with the first downward protrusive ring 251, when the movable member 300 is moved up to the second position. In this case, since the exhaust channel is blocked at two points, it is possible to more effectively block foreign substances. To this end, the upward protrusive ring 313 may be formed in a wedge shape of which the cross-sectional area decreases as it goes up.

When a small amount of liquid flies into the fluid intake hole 111b during cooking, the movable member 300 cannot be lifted by buoyancy. Accordingly, a plurality of liquid foreign substance moves along the exhaust channel, but the liquid foreign substance cannot pass through the gap between the foreign substance shield 311 and the side wall portion 113b of the first member 100 because the gap is narrow, whereby the liquid foreign substance forms a liquid layer in the gap between the foreign substance shield 311 and the side wall portion 113b.

Since a liquid layer is formed in the gap between the foreign substance shield 311 and the side wall portion 113b, the movable member 300 is lifted to the second position by the pressure different between the upper portion and the lower portion, and as shown in FIG. 16, the step 322 of the movable member 300 closes a portion of the exhaust channel by coming in contact with the first downward protrusive ring 251. Accordingly, vacuum exhaust through the exhaust channel is stopped, thereby being able to prevent the liquid foreign substance from reaching the vacuum pump 12.

A powder filter (not shown) may be further included to prevent a powder type ingredient from entering the fluid intake hole 111b and reaching the vacuum pump 12 when a powder type ingredient is used.

The powder filter is installed on the bottom 111 of the first member 100 or is installed in the fluid intake hole 111b, thereby being able to prevent a powder type ingredient from entering the foreign substance trap device 50 through the fluid intake hole 111b.

Alternatively, the powder filter is installed between the second member 200 and the movable member 300 to cross the exhaust channel with the second member 200 and the third member 300 assembled, thereby being able to block a powder type ingredient passing through the exhaust channel.

Alternatively, the powder filter is installed on the bottom 225 of the check valve accommodation hole 222 or installed in the exhaust channel outlet 224, thereby being able to prevent a powder type ingredient entering the foreign substance trap device 50 from the discharged through the exhaust channel outlet 224.

Alternatively, the powder filter is installed on the port contact surface 2111 of the second member 200, thereby being able to prevent a powder type ingredient discharged through the exhaust channel outlet 224 from moving to the vacuum pump 12.

Figure 17:
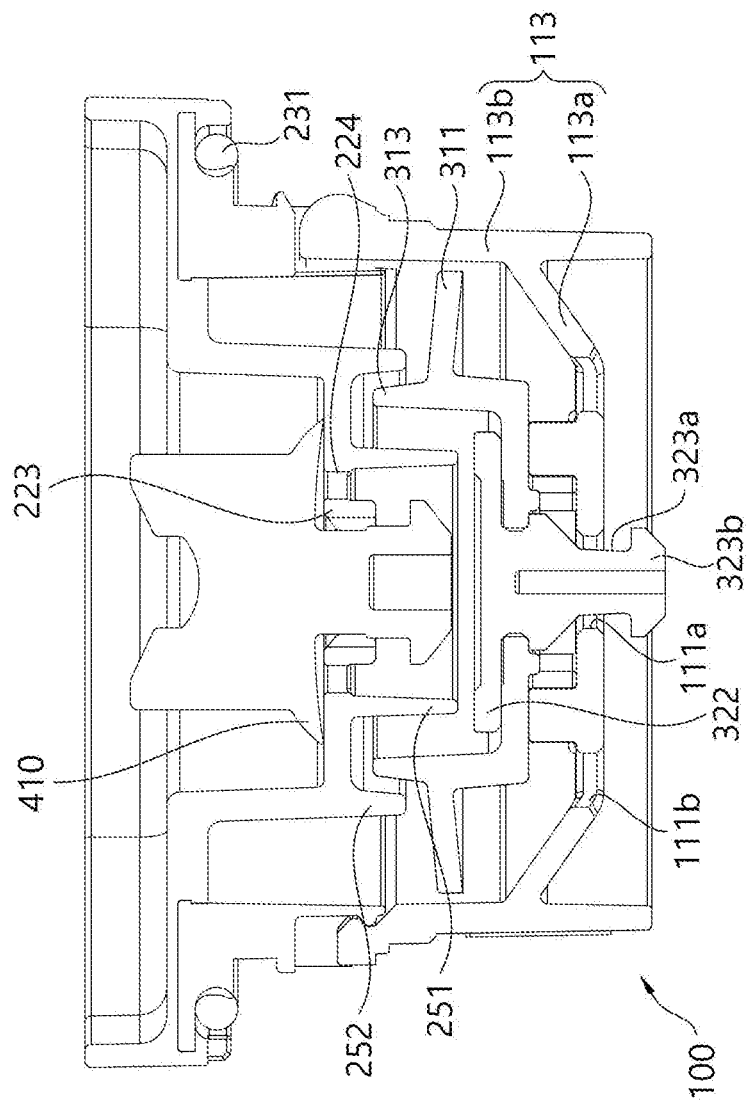
FIG. 17 is a cross-sectional view showing the foreign substance trap device with an outlet of the exhaust channel closed by the check valve.

FIG. 17 is a cross-sectional view showing the foreign substance trap device with an outlet of the exhaust channel closed by the check valve.

As shown in FIG. 17, when the intake port 19 is removed, the portion over the opening/closing wing 410 is at an atmospheric pressure and the exhaust channel is at a negative pressure, so the opening/closing wing 410 closes the exhaust channel outlet 224 by a pressure difference. Accordingly, the inside of the accommodation tub 21 can be maintained at a negative pressure.

Hereafter, a cooking device according to another embodiment of the present disclosure is described. For the convenience of description, parts similar to those of the first embodiment are given the same reference numerals and common configuration with the first embodiment is not described.

Figure 18:
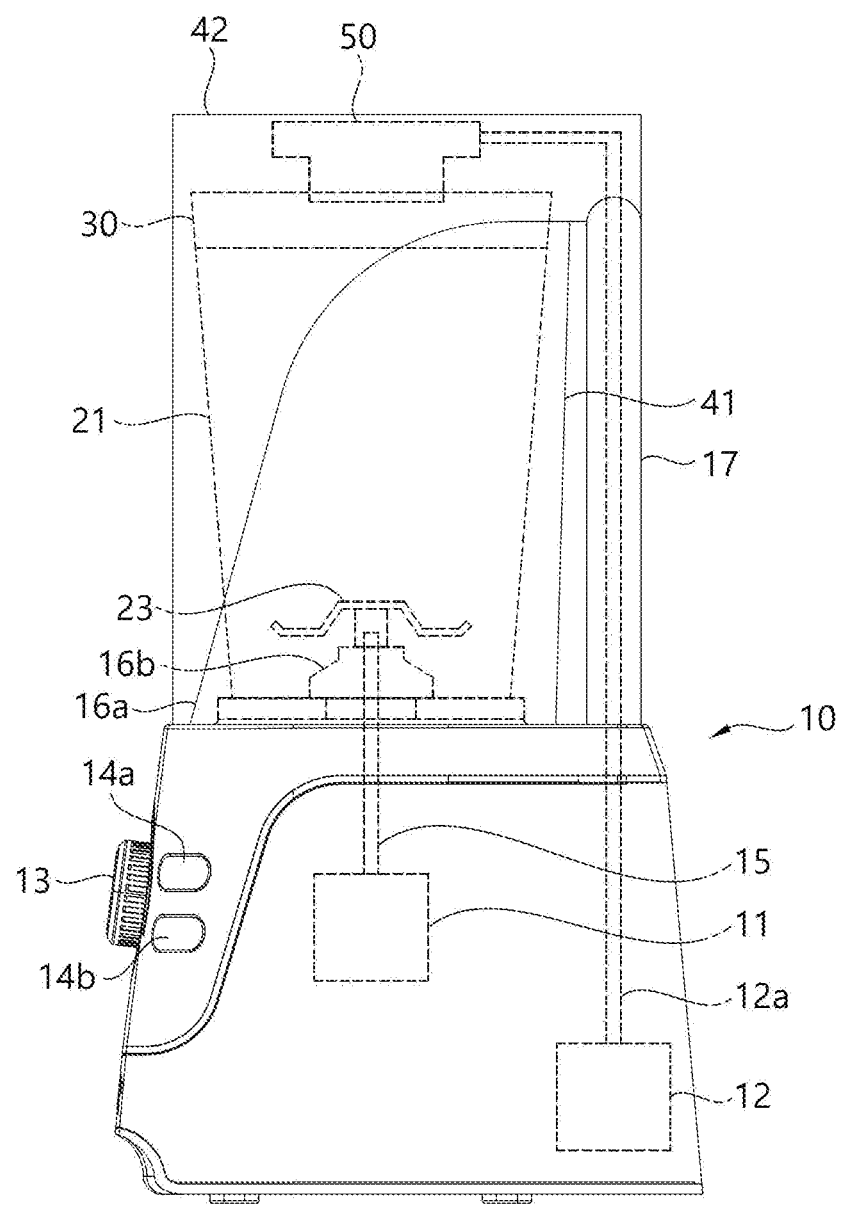
FIG. 18 is a view schematically showing a cooking device according to another embodiment of the present disclosure.

FIG. 18 is a view schematically showing a cooking device according to another embodiment of the present disclosure.

As shown in FIG. 18, a cooking device 2 according to the embodiment further includes enclosures 41 and 42. The enclosures 41 and 42 are formed to surround the accommodation tub 21 and the lid 30, thereby preventing noise generated in the accommodation tub 21 by the pressing member 23.

The enclosures 41 and 42 may include an upper enclosure 42 and a lower enclosure 41, in which the lower enclosure 41 may be installed over the base 10 and the upper enclosure 42 may be rotatably installed on the support post 17.

The foreign substance trap device 50 is installed in the lid 30 in the cooking device 1 according to the embodiment described above, but in the cooking device 2 according to the embodiment, the foreign substance trap device 50 is installed in the upper enclosure 42. The exhaust channel of the foreign substance trap device 50 may be connected to the inside of the accommodation tub 21 through the lid 30.

It should be understood that the present disclosure may be implemented in other detailed ways by those skilled in the art without changing the scope or necessary features of the present disclosure. Therefore, the embodiments described above are only examples and should not be construed as being limitative in all respects. The scope of the present disclosure is defined by the following claims rather than the above detailed description, and all of changes and modifications obtained from the meaning and range of claims and equivalent concepts should be construed as being included in the scope of the present disclosure.

MODE FOR INVENTION

A foreign substance trap device according to an embodiment of the present disclosure includes: a first member in which at least one fluid intake hole is formed; a second member in which at least a portion of an exhaust channel, through which gas in liquid flowing inside through the fluid intake hole is discharged, is formed; and a movable member movably disposed between the first member and the second member and closing the exhaust channel by being moved by liquid in fluid flowing inside through the fluid intake hole.

The movable member may close the exhaust channel by being moved to the second member by buoyancy of the liquid.

The movable member may be accommodated in the first member, the movable member may be positioned such that at least a portion of an outer surface of the movable member is adjacent to an inner surface of the first member, and when the liquid flows between the outer surface of the movable member and the inner surface of the first member, the movable member may close the exhaust channel by being moved to the second member by force that discharges the gas to the outside through the exhaust channel.

The first member may include a bottom in which at least a portion of the fluid intake hole is formed and a side wall portion extending upward from the bottom, and the side wall portion may include an inclined portion that forms an inclination from an outer circumference of the bottom and extends upward.

The movable member may include a foreign substance shield having an outer diameter smaller than an inner diameter of the side wall portion and formed such that an outer circumference is adjacent to an inner wall of the side wall portion, and a foreign substance entering the first member through the fluid intake hole may move along the inclined portion and may be discharged out of the first member through the fluid intake hole without passing through between the foreign substance shield and the side wall portion.

The first member may include a bottom in which at least a portion of the fluid intake hole is formed and a side wall portion extending upward from the bottom, and the side wall portion may include a guide groove coupled to a side of the movable member to guide the movable member to be able to move up and down.

The movable member may be installed rotatably about an upper end of the guide groove with respect to the first member with a side of the movable member positioned at the upper end of the guide groove.

The movable member may include a foreign substance shield, a lifting shaft protruding downward from the foreign substance shield, an anti-separation portion extending from a lower end of the lifting shaft and having a diameter larger than the lifting shaft, a lifting shaft accommodation hole through which the lifting shaft passes may be formed in the bottom of the first member, and a gap may be formed between the lifting shaft accommodation hole and the lifting shaft, so the movable member may freely move up and down with respect to the first member as long as the lifting shaft is positioned in the lifting shaft accommodation hole.

The movable member may not be separated from the first member or the second member.

The first member may include a bottom in which at least a portion of the fluid intake hole and a side wall portion extending upward from the bottom; the movable member may include a foreign substance shield having an outer diameter smaller than an inner diameter of the side wall portion and formed such that an outer circumference is adjacent to an inner wall of the inner wall portion, and an upward protrusive ring protruding in an annular shape from a top surface of the foreign substance shield; the second member may include a first downward protrusive ring and a second downward protrusive ring that are exposed downward; and the upward protrusive ring may be positioned between the first downward protrusive ring and the second downward protrusive ring, thereby forming a portion of the exhaust channel.

The movable member may be movably disposed between a first position at which the exhaust channel is opened and a second position at which the exhaust channel is closed, the upward protrusive ring may keep being spaced apart from the first downward protrusive ring and the second downward protrusive ring when the movable member is positioned at the first position, and the upward protrusive ring may block the exhaust channel in contact with at least one of the first downward protrusive ring and the second downward protrusive ring when the movable member is positioned at the second position.

The first downward protrusive ring may be positioned inside the second downward protrusive ring, and the first downward protrusive ring may protrude downward further than the second downward protrusive ring.

The first member may include a bottom in which at least a portion of the fluid intake hole and a side wall portion extending upward from the bottom; the movable member may include a foreign substance shield having an outer diameter smaller than an inner diameter of the side wall portion and formed such that an outer circumference is adjacent to an inner wall of the inner wall portion, and an upward protrusive ring protruding in an annular shape from a top surface of the foreign substance shield; the second member may include a downward protrusive ring exposed downward, positioned adjacent to the upward protrusive ring, and forming a portion of the exhaust channel; and the movable member may include a chamber space in which at least a portion of the downward protrusive ring is accommodated and a blocking plate forming at least a portion of a bottom of the chamber space.

The movable member may be movably disposed between a first position at which the exhaust channel is opened and a second position at which the exhaust channel is closed, the upward protrusive ring and the blocking plate may keep being spaced apart from each other when the movable member is at the first position, and the blocking plate may block the exhaust channel in contact with the downward protrusive ring when the movable member is positioned at the second position.

The movable member may be rotatably coupled to a side of the first member and the second member may be rotatably coupled to the other side of the first member.

When the movable member is not positioned in the first member or between the first member and the second member, the second member may not be coupled to the first member.

The foreign substance trap device further includes a check valve installed in the second member and opening/closing an outlet of the exhaust channel, in which the check valve may include an opening/closing wing and an installation portion extending downward from a center of the opening/closing wing, and the second member may include an installation portion accommodation hole through which the installation portion passes and at least one exhaust channel outlet formed around the installation portion accommodation hole to be positioned under the opening/closing wing and being opened/closed by the opening/closing wing.

The opening/closing wing may close the exhaust channel outlet at an atmospheric pressure and may open the exhaust channel outlet at a negative pressure.

The installation portion may include a first installation portion having an outer diameter smaller than an inner diameter of the installation portion accommodation hole and a second installation portion having an outer diameter larger than the outer diameter of the first installation portion, and the check valve may not be moved due to own weight of the check valve with the second installation portion fitted in the installation portion accommodation hole.

The opening/closing wing may open the exhaust channel outlet with the second installation portion fitted in the installation portion accommodation hole.

A cooking device according to an embodiment of the present disclosure that includes a container accommodating food that is a processing target, a lid covering an opening of the container, and a vacuum pump evacuating air from the container through the lid, includes a foreign substance trap device installed in the lid and preventing liquid in the container from flowing into the vacuum pump while air in the container is excavated, in which the foreign substance trap device includes: a first member in which a least one fluid intake hole communicating with an inside of the container; a second member in which at least a portion of an exhaust channel, through which gas in liquid flowing inside through the fluid intake hole is discharged to the vacuum pump, is formed; and a movable member movably disposed between the first member and the second member and closing the exhaust channel by being moved by liquid in fluid flowing inside through the fluid intake hole.

A trap installation hole in which the foreign substance trap device is installed may be formed through the lid, and the foreign substance trap device may be detachably installed in the trap installation hole.

The cooking device may further include a pressing rod that presses down food in the container toward a bottom of the container, in which the pressing rod may be inserted into the container through the trap installation hole with the foreign substance trap device removed from the lid.

A cooking device according to an embodiment of the present disclosure that includes a container accommodating food that is a processing target, an enclosure formed to surround at least a portion of the container and blocking noise generated from the container, and a vacuum pump evacuating air from the container through the enclosure, includes a foreign substance trap device installed in the lid and preventing liquid in the container from flowing into the vacuum pump while air in the container is excavated, in which the foreign substance trap device includes: a first member in which a least one fluid intake hole communicating with an inside of the container; a second member in which at least a portion of an exhaust channel, through which gas in liquid flowing inside through the fluid intake hole is discharged to the vacuum pump, is formed; and a movable member movably disposed between the first member and the second member and closing the exhaust channel by being moved by liquid in fluid flowing inside through the fluid intake hole.

The invention claimed is:

1. A foreign substance trap device comprising:
   a first member in which at least one fluid intake hole is formed;
   a second member in which at least a portion of an exhaust channel, through which gas in liquid flowing inside through the fluid intake hole is discharged, is formed; and
   a movable member movably disposed between the first member and the second member and closing the exhaust channel by being moved by liquid in fluid flowing inside through the fluid intake hole,
   wherein the movable member includes:
      a foreign substance shield;
      a lifting shaft protruding downward from the foreign substance shield;
      an anti-separation portion extending from a lower end of the lifting shaft and having a diameter larger than the lifting shaft;
      wherein a lifting shaft accommodation hole through which the lifting shaft passes is formed in a bottom of the first member, and
      wherein a gap is formed between the lifting shaft accommodation hole and the lifting shaft, so the movable member freely moves up and down with respect to the first member as long as the lifting shaft is positioned in the lifting shaft accommodation hole.

2. The foreign substance trap device of claim 1, wherein the movable member closes the exhaust channel by being moved to the second member by buoyancy of the liquid.

3. The foreign substance trap device of claim 1, wherein the movable member is accommodated in the first member, the movable member is positioned such that at least a portion of an outer surface of the movable member is adjacent to an inner surface of the first member, and when the liquid flows between the outer surface of the movable member and the inner surface of the first member, the movable member closes the exhaust channel by being moved to the second member by force that discharges the gas to the outside through the exhaust channel.

4. The foreign substance trap device of claim 1, wherein the first member includes a bottom in which at least a portion of the fluid intake hole is formed and a side wall portion extending upward from the bottom, and the side wall portion includes an inclined portion that forms an inclination from an outer circumference of the bottom and extends upward.

5. The foreign substance trap device of claim 4, wherein the movable member includes the foreign substance shield having an outer diameter smaller than an inner diameter of the side wall portion and formed such that an outer circumference is adjacent to an inner wall of the side wall portion, and
   a foreign substance entering the first member through the fluid intake hole moves along the inclined portion and is discharged out of the first member through the fluid intake hole without passing through between the foreign substance shield and the side wall portion.

6. The foreign substance trap device of claim 1, wherein the first member includes a bottom in which at least a portion of the fluid intake hole is formed and a side wall portion extending upward from the bottom, and
   the side wall portion includes a guide groove coupled to a side of the movable member to guide the movable member to be able to move up and down.

7. The foreign substance trap device of claim 6, wherein the movable member is installed rotatably about an upper end of the guide groove with respect to the first member with a side of the movable member positioned at the upper end of the guide groove.

8. The foreign substance trap device of claim 1, wherein the first member includes a bottom in which at least a portion of the fluid intake hole and a side wall portion extending upward from the bottom,
   the movable member includes the foreign substance shield having an outer diameter smaller than an inner diameter of the side wall portion and formed such that an outer circumference is adjacent to an inner wall of the inner wall portion, and an upward protrusive ring protruding in an annular shape from a top surface of the foreign substance shield, the second member includes a first downward protrusive ring and a second downward protrusive ring that are exposed downward, and the upward protrusive ring is positioned between the first downward protrusive ring and the second downward protrusive ring, thereby forming a portion of the exhaust channel.

9. The foreign substance trap device of claim 8, wherein the movable member is movably disposed between a first position at which the exhaust channel is opened and a second position at which the exhaust channel is closed, the upward protrusive ring keeps being spaced apart from the first downward protrusive ring and the second downward protrusive ring when the movable member is positioned at the first position, and the upward protrusive ring blocks the exhaust channel in contact with at least one of the first downward protrusive ring and the second downward protrusive ring when the movable member is positioned at the second position.

10. The foreign substance trap device of claim 8, wherein the first downward protrusive ring is positioned inside the second downward protrusive ring, and the first downward protrusive ring protrudes downward further than the second downward protrusive ring.

11. The foreign substance trap device of claim 1, wherein the first member includes a bottom in which at least a portion of the fluid intake hole and a side wall portion extending upward from the bottom, the movable member includes the foreign substance shield having an outer diameter smaller than an inner diameter of the side wall portion and formed such that an outer circumference is adjacent to an inner wall of the inner wall portion, and an upward protrusive ring protruding in an annular shape from a top surface of the foreign substance shield, the second member includes a downward protrusive ring exposed downward, positioned adjacent to the upward protrusive ring, and forming a portion of the exhaust channel, and the movable member further includes a chamber space in which at least a portion of the downward protrusive ring is accommodated and a blocking plate forming at least a portion of a bottom of the chamber space.

12. The foreign substance trap device of claim 11, wherein movable member is movably disposed between a first position at which the exhaust channel is opened and a second position at which the exhaust channel is closed, the upward protrusive ring and the blocking plate keep being spaced apart from each other when the movable member is at the first position, and the blocking plate blocks the exhaust channel in contact with the downward protrusive ring when the movable member is positioned at the second position.

13. The foreign substance trap device of claim 1, wherein the movable member is rotatably coupled to a side of the first member and the second member is rotatably coupled to the other side of the first member.

14. The foreign substance trap device of claim 1, further comprising a check valve installed in the second member and opening/closing an outlet of the exhaust channel, wherein the check valve includes an opening/closing wing and an installation portion extending downward from a center of the opening/closing wing, and the second member includes an installation portion accommodation hole through which the installation portion passes and at least one exhaust channel outlet formed around the installation portion accommodation hole to be positioned under the opening/closing wing and being opened/closed by the opening/closing wing.

15. The foreign substance trap device of claim 14, wherein the installation portion includes a first installation portion having an outer diameter smaller than an inner diameter of the installation portion accommodation hole and a second installation portion having an outer diameter larger than the outer diameter of the first installation portion, and the check valve is not moved due to own weight of the check valve with the second installation portion fitted in the installation portion accommodation hole.

* * * * *